United States Patent
Abe et al.

(10) Patent No.: US 7,352,426 B2
(45) Date of Patent: Apr. 1, 2008

(54) ELECTRODE-WIRING SUBSTRATE AND DISPLAY DEVICE

(75) Inventors: Takao Abe, Kumamoto (JP); Naoyuki Tanaka, Mie (JP); Kohichi Sawada, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 232 days.

(21) Appl. No.: 10/543,271

(22) PCT Filed: Sep. 16, 2004

(86) PCT No.: PCT/JP2004/013535

§ 371 (c)(1),
(2), (4) Date: Jul. 25, 2005

(87) PCT Pub. No.: WO2005/029450

PCT Pub. Date: Mar. 31, 2005

(65) Prior Publication Data

US 2006/0138461 A1    Jun. 29, 2006

(30) Foreign Application Priority Data

Sep. 19, 2003 (JP) ............................. 2003-327181

(51) Int. Cl.
G02F 1/1335 (2006.01)
(52) U.S. Cl. .................. 349/149; 349/151; 349/152
(58) Field of Classification Search ........ 349/149–152, 349/139
See application file for complete search history.

(56) References Cited

U.S. PATENT DOCUMENTS

| | | | |
|---|---|---|---|
| 5,995,189 A | 11/1999 | Zhang | |
| 6,057,564 A | 5/2000 | Rennie | |
| 6,281,959 B1* | 8/2001 | Kim et al. | 349/152 |
| 6,295,109 B1 | 9/2001 | Kubo et al. | |
| 6,636,288 B2* | 10/2003 | Kim et al. | 349/139 |
| 2003/0053022 A1* | 3/2003 | Kaneko et al. | 349/153 |
| 2004/0012744 A1* | 1/2004 | Ishige et al. | 349/139 |

FOREIGN PATENT DOCUMENTS

| | | |
|---|---|---|
| JP | 05-181154 | 7/1993 |
| JP | 06-011721 | 1/1994 |
| JP | 09-179130 | 7/1997 |
| JP | 09-311341 | 12/1997 |
| JP | 2001-53702 | 2/2001 |
| JP | 3276557 B | 2/2002 |
| JP | 2002-207221 | 7/2002 |
| JP | 3377447 B | 12/2002 |
| JP | 2004-53702 | 2/2004 |

* cited by examiner

Primary Examiner—Andrew Schechter
Assistant Examiner—John Heyman
(74) Attorney, Agent, or Firm—Keating & Bennett, LLP (57) ABSTRACT

An electrode-wiring substrate includes first routing wires (108) made of gate material for forming gate electrode wires (105) and second routing wires (110) made of source material for forming source electrode wires (106). The first routing wires (108) and the second routing wires (110) are arranged alternately so as not to coincide with each other when viewed in plan. The second routing wires (110) are electrically connected to the gate electrode wires (105) via first contact holes (111) and to gate electrode terminals (102) via second contact holes (113).

8 Claims, 7 Drawing Sheets

ELECTRODE-WIRING SUBSTRATE AND DISPLAY DEVICE

BACKGROUND OF THE INVENTION

1. Field of the Invention

The present invention relates to an electrode-wiring substrate and a display device. For example, the electrode-wiring substrate may be a TFT (Thin Film Transistor) substrate and the display device may be a liquid crystal display device.

2. Description of the Related Art

Lately, in the field of display devices, which are man-machine interfaces, conventionally used cathode-ray tube (CRT) displays are being replaced with flat panel displays having the advantages of being thin, space-saving, light-weight and power-thrifty. In particular, it is no exaggeration to state that the flat panel display is applied to every monitor for mobile applications such as digital cameras, cellular phones and PDAs (Personal Digital Assistances).

There are three major flat panel displays for the above-mentioned applications: FEDs (Field Emission Displays); LCDs (Liquid Crystal Displays); and EL (Electroluminescence) displays. For each of the three displays, there are active displays including a drive TFT in each pixel and passive displays including no drive element. However, in Japan, the active displays are the favored ones in terms of superior image quality.

The flat panel displays for mobile applications as described above are spreading remarkably. Recently, on the market, there is a tendency to increase the size of a display screen and decrease the size of a peripheral region of the panel. That is, it has been required to equalize the outside shape of the panel and the effective size of the screen as possible. Due to demand for high-resolution, it has also been required to provide a plurality of electrode wires.

Further, in the field of flat panel displays, especially displays for cellular phones, it has also been required on the market in recent years to position the display screen at the center of the outside shape. However, in general, gate electrode terminals and source electrode terminals are formed in the peripheral region at one of the four sides of the screen, respectively. Thus, terminal regions are provided at two of the four sides of the screen. If the terminal regions are provided at the two sides of the screen, the center of the display screen is shifted to the left or right. Therefore, without taking the peripheral regions at the left and right sides of the display screen, the gate electrode terminals and the source electrode terminals are arranged only in one of the peripheral regions at the top or bottom sides of the display screen, thereby positioning the screen at the center.

On the other hand, in order to provide a display device of high manufacturing yield in which a number of electrode wires are connected to signal input terminals formed in the peripheral region at one of the sides of the display screen, the peripheral region needs to have a certain size. Therefore, what is important is to reduce the size of the peripheral region. However, if the region for forming the electrode wires is reduced, the pitch between the wires is also reduced. This may lead to a problem of a decrease in yield. In particular, as to COG (Chip On Glass) devices, a decrease in chip size for cost reduction requires further reduction of the pitch between the wires in a mounting region, thereby decreasing the yield to a further extent. In driver monolithic displays in which drivers are formed in the peripheral region, such a problem does not arise because the terminals are not concentrated at one of the sides of the display screen.

Japanese Patent No. 3276557 discloses a liquid crystal display device as a solution to this problem. The display device of Japanese Patent No. 3276557 includes multilayer wires of two or more layers prepared by connecting part of a conductive wire to another conductive wire via a contact hole such that the conductive wires overlap each other with an interlayer insulating film interposed therebetween. More specifically, as conductive wires for connecting gate electrode wires to gate electrode terminals, common first conductive wires made of gate material are formed and then second conductive wires made of source material are formed on the first conductive wires with an interlayer insulating layer interposed therebetween to obtain two-layered conductive wires. Further, contact holes are opened so that the gate electrode wires, gate electrode terminals and second conductive wires are electrically connected. In this way, the first and second conductive wires are connected.

Figure 7:
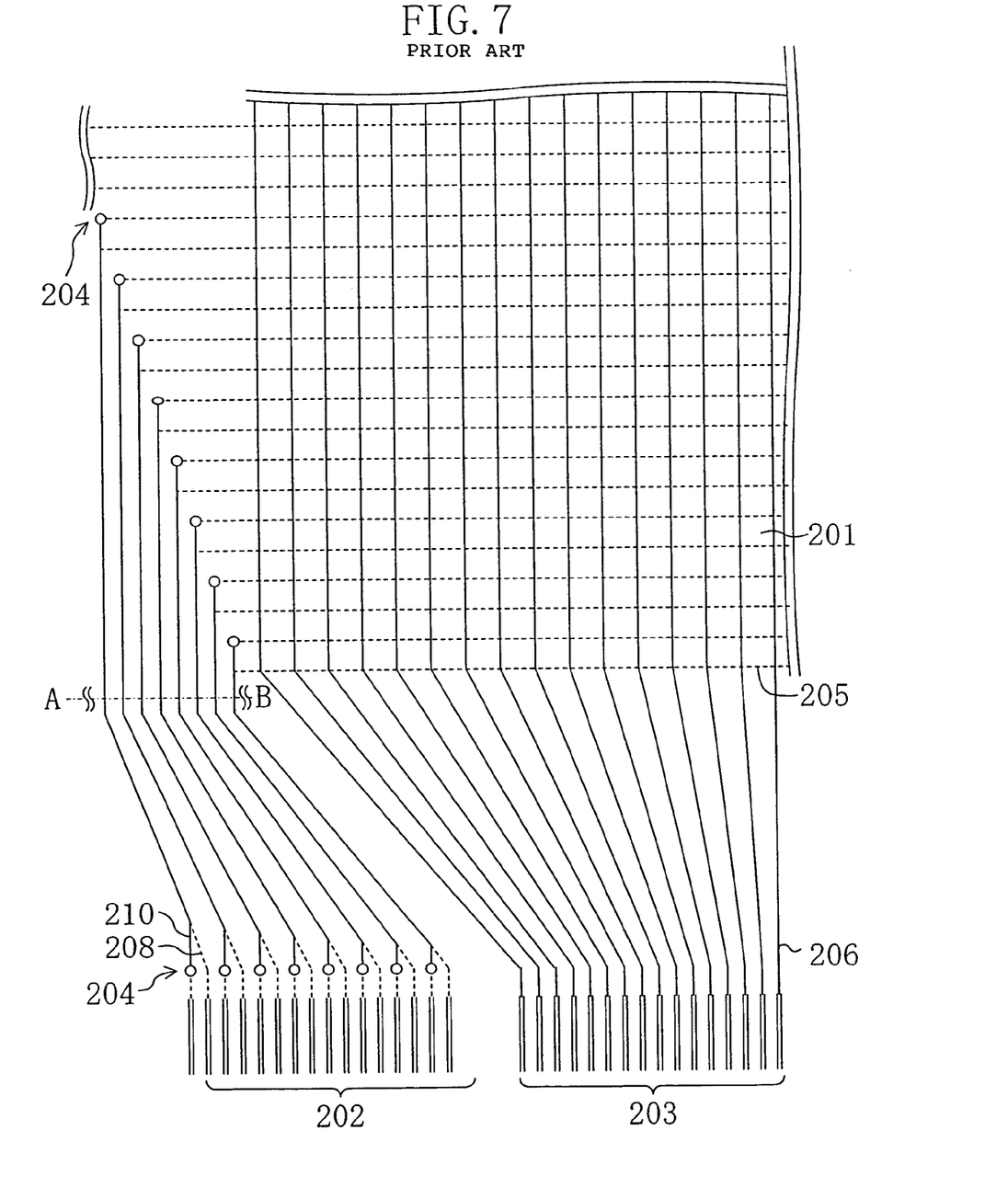
FIG. 7 is a schematic plan view illustrating part of conductive wires disclosed by Japanese Patent No. 3276557.
Figure 8:
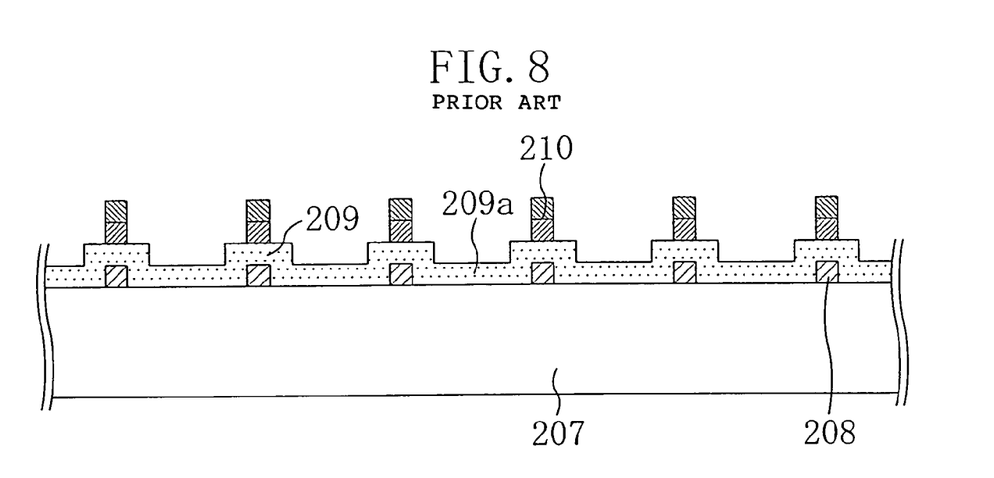
FIG. 8 is a sectional view taken along the line A-B shown in FIG. 7.
Figure 9:
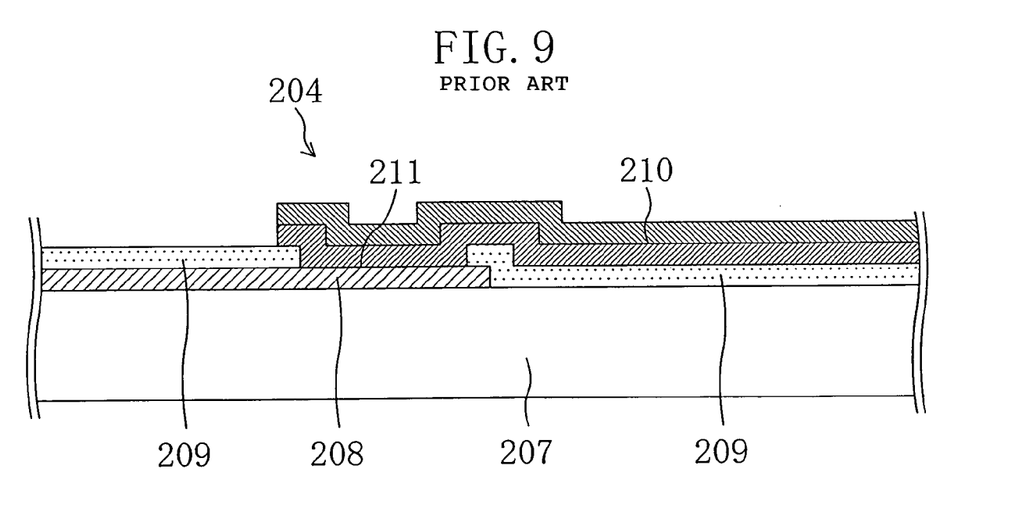
FIG. 9 is a sectional view of a conductive wire connecting part disclosed by Japanese Patent No. 3276557.

Referring to FIGS. 7, 8 and 9, the liquid crystal display device of Japanese Patent No. 3276557 is described in further detail. FIG. 7 is a plan view illustrating part of the conductive wires disclosed by Japanese Patent No. 3276557, FIG. 8 is a sectional view taken along the line A-B shown in FIG. 7 and FIG. 9 is a sectional view illustrating a conductive wiring connecting part.

FIG. 7 shows a display region 201, gate (scanning electrode) terminals 202, source (signal electrode) terminals 203, conductive wire connecting parts 204, gate electrode wires 205 and source electrode wires 206. FIG. 8 shows a glass substrate 207, gate connection wires 208, an interlayer insulating layer 209 and source connection wires 210. The gate connection wires 208 and source connection wires 210 provide a two-layered structure with the interlayer insulating layer 209 interposed therebetween. The gate connection wires 208 are patterned simultaneously when the gate electrode wires 205 are patterned in the process of forming the gate wires on a TFT (Thin Film Transistor) array substrate. The source connection wires 210 are patterned simultaneously when the source electrode wires 206 are patterned in the process of forming the source wires on the TFT array substrate.

In FIG. 9, reference numeral 211 indicates a contact hole (conductive wire connecting part 204). By providing the contact hole 211, the gate connection wire 208 and the source connection wire 210 are arranged to coincide with each other. Therefore, two conductive wires are arranged in space for a single conductive wire. In this case, in a region for forming routing wires which connect the gate electrode wires to the gate terminals, the source connection wires 210 are stacked on the gate connection wires 208 with the interlayer insulating layer 209 interposed therebetween. Therefore, as compared with a common arrangement of the gate connection wires only, the routing wire region (corresponding to the peripheral region) is reduced down to about ½. That is, the peripheral region is significantly reduced in size.

Recently, reflective liquid crystal display devices and transmittive liquid crystal display devices which allow display in both reflective and transmissive modes are becoming the mainstream of monitors for the above-described mobile applications. In particular, the transmittive liquid crystal display devices which allow display in both reflective and transmissive modes have features of the reflective mode such as improved display recognition under bright ambient light and features of the transmissive mode such as improved display recognition under dark ambient light. Regardless of the degree of brightness of the ambient light, clear display is achieved. Therefore, such display devices are most required ones on the market. For example, a liquid crystal display panel disclosed by Japanese Patent No. 3377447 is an example of the transmittive liquid crystal display devices. In this liquid crystal display device, a first conductive layer (transparent conductive film) of high light transmittance and a second conductive layer (reflective conductive film) of high light reflectance, which are electrically connected to each other, are formed in a single pixel region to provide a pixel electrode. The first and second conductive layers are formed at different levels with an insulating layer made of an organic resin interposed therebetween.

The liquid crystal display device of Japanese Patent No. 3276557 includes the routing wires provided by stacking the source connection wires 210 immediately above the gate connection wires 208 with the interlayer insulating layer 209 interposed therebetween. This structure brings about the following three problems of manufacturing yield. First, since the interlayer insulating layer 209 are sandwiched between the conductive wires 208 and 210, display quality may presumably deteriorate due to the effect of the capacitance of the interlayer insulating layer 209 sandwiched between the gate and source conductive wires 208 and 210 (hereinafter may be referred to capacitance interaction). For example, due to the capacitance of the interlayer insulating layer 209, signal transmission delay occurs to deteriorate display quality. Further, an increase in impedance leads to an increase in power consumption, which is a critical defect in terms of mobile applications.

Second, electrostatic breakdown may possibly occur in the interlayer insulating layer 209. Wires where the electrostatic breakdown has occurred bring about defects in gate electrode wires in the display region, resulting in reduction in yield.

Third, parts of the obtained substrate where the gate connection wire 208, interlayer insulating layer 209 and source connection wire 210 are stacked give a large difference in height from parts of the interlayer insulating layer 209 (interlayer insulating layer 209a) sandwiched between adjacent stacked parts. The insulating layer of the liquid crystal display panel of Japanese Patent No. 3377447 is formed by applying an organic resin and spin-coating the resin to obtain an insulating layer of uniform thickness. However, the height difference in the routing wire region causes radial unevenness in the resulting resin film. If the height difference in the routing wire region increases, such a defect occurs with an increased probability, thereby resulting in reduction of manufacturing yield.

SUMMARY OF THE INVENTION

As to display devices, one of the objects of the present invention is to provide a center-positioned screen and reduce the size of a peripheral region around the screen, thereby improving manufacturing yield.

In an electrode-wiring substrate of the present invention, the source connection wires 210 are not stacked immediately above the gate connection wires 208 with the interlayer insulating layer 209 interposed therebetween. Instead, the gate connection wires and the source connection wires are arranged alternately when viewed in plan. Therefore, the interaction between both of the conductive wires is eliminated. Accordingly, likewise Japanese Patent No. 3276557, the center-positioned screen and the peripheral region of reduced size are realized. Further, the present invention allows an improvement in manufacturing yield.

The electrode-wiring substrate of the present invention comprises: a plurality of gate electrode wires which are formed on an insulating substrate; a plurality of source electrode wires which intersect with the gate electrode wires, respectively; an insulating layer which electrically insulates the gate electrode wires from the source electrode wires; a plurality of switching elements which are formed near the intersections of the gate electrode wires and the source electrode wires, respectively; a display region which includes a plurality of pixel electrodes connected to the switching elements, respectively; a plurality of gate electrode terminals which are arranged at the periphery of the display region to input signals to the gate electrode wires, respectively; a plurality of source electrode terminals which are arranged at the periphery of the display region to input signals to the source electrode wires, respectively; a plurality of gate routing wires which are arranged at the periphery of the display region to connect the gate electrode wires to the gate electrode terminals, respectively; and a plurality of source routing wires which are arranged at the periphery of the display region to connect the source electrode wires to the source electrode terminals, respectively, wherein the gate routing wires and/or the source routing wires include first routing wires made of gate material for forming the gate electrode wires and second routing wires which are electrically insulated from the first routing wires by the insulating layer and made of source material for forming the source electrode wires and the first routing wires and the second routing wires are alternately arranged so as not to coincide with each other when viewed in plan and the insulating layer includes at least a pair of a first connection hole and a second connection hole and the first connection hole electrically connects the first routing wire or the second routing wire to the gate electrode wire or the source electrode wire, while the second connection hole electrically connects the first routing wire or the second routing wire to the gate electrode terminal or the source electrode terminal.

The electrode-wiring substrate of the present invention includes, not only bottom-gate (inverted stagger) TFT array substrates in which gate electrodes are arranged below a semiconductor layer (active layer), but also top-gate (stagger) TFT array substrates in which gate electrodes are arranged on the semiconductor layer (active layer). Further, the above-described alternately arranged wires may be applicable not only to the gate routing wires but also to the source routing wires. Therefore, the electrode-wiring substrate of the present invention includes the following four embodiments of (1) to (4). Among which, embodiments (1) and (2) are bottom-gate TFT array substrates, while embodiments (3) and (4) are top-gate TFT array substrates.

(1) An electrode-wiring substrate comprising: a plurality of gate electrode wires which are formed on an insulating substrate; an insulating layer which covers the gate electrode wires; a plurality of source electrode wires which are formed on the insulating layer and intersect with the gate electrode wires, respectively; a plurality of switching elements which are formed near the intersections of the gate electrode wires and the source electrode wires, respectively; a display region which includes a plurality of pixel electrodes which are connected to the switching elements, respectively; a plurality of gate electrode terminals which are arranged at the periphery of the display region to input signals to the gate electrode wires, respectively; a plurality of source electrode terminals which are arranged at the periphery of the display region to input signals to the source electrode wires, respectively; a plurality of gate routing wires which are arranged at the periphery of the display region to connect the gate electrode wires to the gate electrode terminals, respectively; and a plurality of source routing wires which are arranged at the periphery of the display region to connect the source electrode wires to the source electrode terminals, respectively, wherein the gate routing wires include first routing wires made of gate material for forming the gate electrode wires and second routing wires which are formed on the insulating layer covering the first routing wires and made of source material for forming the source electrode wires and the first routing wires and the second routing wires are alternately arranged so as not to coincide with each other (not to be layered) when viewed in plan. Where the gate electrode terminals are made of the gate material, the insulating layer includes at least a pair of a first connection hole and a second connection hole. The first connection hole electrically connects the second routing wire to the gate electrode wire, while the second connection hole electrically connects the second routing wire to the gate electrode terminal. On the other hand, where the gate electrode terminals are made of the source material, the insulating layer includes at least a pair of a first connection hole and a second connection hole. The first connection hole electrically connects the second routing wire to the gate electrode wire, while the second connection hole electrically connects the first routing wire to the gate electrode terminal.

(2) An electrode-wiring substrate comprising: a plurality of gate electrode wires formed on an insulating substrate; an insulating layer which covers the gate electrode wires; a plurality of source electrode wires which are formed on the insulating layer and intersect with the gate electrode wires, respectively; a plurality of switching elements which are formed near the intersections of the gate electrode wires and the source electrode wires, respectively; a display region including a plurality of pixel electrodes which are connected to the switching elements, respectively; a plurality of gate electrode terminals which are arranged at the periphery of the display region to input signals to the gate electrode wires, respectively; a plurality of source electrode terminals which are arranged at the periphery of the display region to input signals to the source electrode wires, respectively; a plurality of gate routing wires which are arranged at the periphery of the display region to connect the gate electrode wires to the gate electrode terminals, respectively; and a plurality of source routing wires which are arranged at the periphery of the display region to connect the source electrode wires to the source electrode terminals, respectively, wherein the source routing wires include first routing wires made of gate material for forming the gate electrode wires and second routing wires which are formed on the insulating layer covering the first routing wires and made of source material for forming the source electrode wires and the first routing wires and the second routing wires are alternately arranged so as not to coincide with each other (not to be layered) when viewed in plan. Where the source electrode terminals are made of the source material, the insulating layer includes at least a pair of a first connection hole and a second connection hole. The first connection hole electrically connects the first routing wire to the source electrode wire, while the second connection hole electrically connects the first routing wire to the source electrode terminal. On the other hand, where the source electrode terminals are made of the gate material, the insulating layer includes at least a pair of a first connection hole and a second connection hole. The first connection hole electrically connects the first routing wire to the source electrode wire, while the second connection hole electrically connects the second routing wire to the source electrode terminal.

(3) An electrode-wiring substrate comprising: a plurality of source electrode wires formed on an insulating substrate; an insulating layer which covers the source electrode wires; a plurality of gate electrode wires which are formed on the insulating layer and intersect with the source electrode wires, respectively; a plurality of switching elements which are formed near the intersections of the source electrode wires and the gate electrode wires, respectively; a display region including a plurality of pixel electrodes which are connected to the switching elements, respectively; a plurality of source electrode terminals which are arranged at the periphery of the display region to input signals to the source electrode wires, respectively; a plurality of gate electrode terminals which are arranged at the periphery of the display region to input signals to the gate electrode wires, respectively; a plurality of source routing wires which are arranged at the periphery of the display region to connect the source electrode wires to the source electrode terminals, respectively; and a plurality of gate routing wires which are arranged at the periphery of the display region to connect the gate electrode wires to the gate electrode terminals, respectively, wherein the source routing wires include first routing wires made of source material for forming the source electrode wires and second routing wires which are formed on the insulating layer covering the first routing wires and made of gate material for forming the gate electrode wires and the first routing wires and the second routing wires are alternately arranged so as not to coincide with each other (not to be layered) when viewed in plan. Where the gate electrode terminals are made of the gate material, the insulating layer includes at least a pair of a first connection hole and a second connection hole. The first connection hole electrically connects the first routing wire to the gate electrode wire, while the second connection hole electrically connects the first routing wire to the gate electrode terminal. On the other hand, where the gate electrode terminals are made of the source material, the insulating layer includes at least a pair of a first connection hole and a second connection hole. The first connection hole electrically connects the first routing wire to the gate electrode wire, while the second connection hole electrically connects the second routing wire to the gate electrode terminal.

(4) An electrode-wiring substrate comprising: a plurality of source electrode wires formed on an insulating substrate; an insulating layer which covers the source electrode wires; a plurality of gate electrode wires which are formed on the insulating layer and intersect with the source electrode wires, respectively; a plurality of switching elements which are formed near the intersections of the source electrode wires and the gate electrode wires, respectively; a display region including a plurality of pixel electrodes which are connected to the switching elements, respectively; a plurality of source electrode terminals which are arranged at the periphery of the display region to input signals to the source electrode wires, respectively; a plurality of gate electrode terminals which are arranged at the periphery of the display region to input signals to the gate electrode wires, respectively; a plurality of source routing wires which are arranged at the periphery of the display region to connect the source electrode wires to the source electrode terminals, respectively; and a plurality of gate routing wires which are arranged at the periphery of the display region to connect the gate electrode wires to the gate electrode terminals, respectively, wherein the source routing wires include first routing wires made of source material for forming the source electrode wires and second routing wires which are formed on the insulating layer covering the first routing wires and made of gate material for forming the gate electrode wires and the first routing wires and the second routing wires are alternately arranged so as not to coincide with each other (not to be layered) when viewed in plan. Where the source electrode terminals are made of the source material, the insulating layer includes at least pair of a first connection hole and a second connection hole. The first connection hole electrically connects the second routing wire to the source electrode wire, while the second connection hole electrically connects the second routing wire to the source electrode terminal. On the other hand, where the source electrode terminals are made of the gate material, the insulating layer includes at least a pair of a first connection hole and a second connection hole. The first connection hole electrically connects the second routing wire to the source electrode wire, while the second connection hole electrically connects the first routing wire to the source electrode terminal.

In the conductive wires in which the gate material and the source material are arranged alternately, the gate material and the source material are electrically connected via a connection hole (contact hole) formed in the insulating layer. Thus, the conductive wires may be used as gate routing races and/or source routing wires. For example, the conductive wires in which the gate material and the source material are arranged alternately may be formed in the process of forming the gate electrode wires or the source electrode wires on the TFT array substrate.

The display region may be rectangular and the gate electrode terminals and the source electrode terminals may be arranged in proximity to any one of the sides of the display region. If the substrate is designed to reduce the size of the peripheral region of the display region, e.g., signal input terminals are concentrated at one of the sides of the display region by arranging the gate and source electrode terminals in proximity to any one of the sides of the display region to achieve a center-positioned screen, it is preferred to employ the alternately arranged wires.

According to the present invention, for providing the center-positioned screen by concentrating the signal input terminals at one of the sides of the display region, the routing region around the display region is reduced in size. Therefore, the panel size decreases and the manufacturing yield improves. More specifically, in an electrode-wiring substrate including the gate wires formed in the display region and the source wires arranged to intersect with the gate wires, the gate material and the source material are alternately arranged to reduce the size of the region for forming gate terminal routing wires at the periphery of the display region. Since the intervals between the gate wires and the intervals the source wires are ensured sufficiently, a decrease in manufacturing yield is avoided. Further, the gate material and the source material are connected via a contact hole formed in an insulating layer. Therefore, the gate material and the source material are used as the gate terminal routing wires.

In the above-described embodiments (1) or (4), the gate routing wires may include the first routing wires and the second routing wires and the first routing wires may further include wires which are formed on the insulating layer and made of the source material. The gate electrode wires may be each connected to the gate electrode terminals via connection holes of the same number formed in the insulating layer. Alternatively, the gate routing wires may include the first routing wires and the second routing wires and the second routing wires may further include wires which are formed on the insulating layer and made of the gate material. The gate electrode wires may be each connected to the gate electrode terminals via connection holes of the same number formed in the insulating layer. By so doing, contact resistances generated in the gate routing wires between the gate electrode wires and the gate electrode terminals are substantially equalized. Since the gate routing wires have substantially identical contact resistance, the occurrence of uneven display is inhibited, thereby improving display quality.

In the above-described embodiments (2) or (3), the source routing wires may include the first routing wires and the second routing wires and the first routing wires may further include wires which are formed on the insulating layer and made of the source material. The source electrode wires may be each connected to the source electrode terminals via connection holes of the same number formed in the insulating layer. Alternatively, the source routing wires may include the first routing wires and the second routing wires and the second routing wires may further include wires which are formed on the insulating layer and made of the gate material. The source electrode wires may be each connected to the source electrode terminals via connection holes of the same number formed in the insulating layer. By so doing, contact resistances generated in the source routing wires between the source electrode wires and the source electrode terminals are substantially equalized. Since the source routing wires have substantially identical contact resistance, the occurrence of uneven display is inhibited, thereby improving display quality.

The display device of the present invention comprises an electrode-wiring substrate having patterns including the alternately arranged wires and counter electrodes facing the electrode-wiring substrate. A display medium layer is provided between the electrode-wiring substrate and the counter electrodes. The display medium layer is a layer whose light transmittance is modulated by a potential difference between electrodes facing each other or a self-luminous layer which emits light by current flowing between electrodes facing each other. The display medium layer may be, for example, a liquid crystal layer, an inorganic or organic EL layer, a light emitting gas layer, an electrophoretic layer and an electrochromic layer. Examples of the display device including the electrode-wiring substrate and a counter substrate arranged to face the electrode-wiring substrate (or the counter electrodes) is mainly a liquid crystal display device having a liquid crystal layer sandwiched between the substrates. However, the display device of the present invention is not limited to the liquid crystal display device. The present invention is also applicable to FEDs (Field Emission Displays), PDPs (Plasma Display Panels), organic EL (organic light emitting diode) displays, inorganic EL (inorganic electroluminescence) displays and electrochromic displays.

The switching elements of the electrode-wiring substrate of the present invention are preferably thin film transistors (TFTs). However, not only the TFTs, two-terminal elements such as MIM (Metal Insulator Metal) may also be used. The alternately arranged wires may also be applicable to passive display devices having no switching elements.

The pixel electrodes may be made of a transparent conductive film for transmissive display, a reflective conductive film for reflective display or a set of a transparent conductive film and a reflective conductive film which allows display in both transmissive and reflective modes.

DETAILED DESCRIPTION OF PREFERRED EMBODIMENTS

Hereinafter, with reference to the drawings, an explanation is given of embodiments of the present invention. In the following embodiments, a bottom-gate TFT array substrate is taken as an example of an electrode-wiring substrate and alternately arranged wires are employed as gate routing wires, but the present invention is not limited thereto.

Embodiment 1

Figure 1:
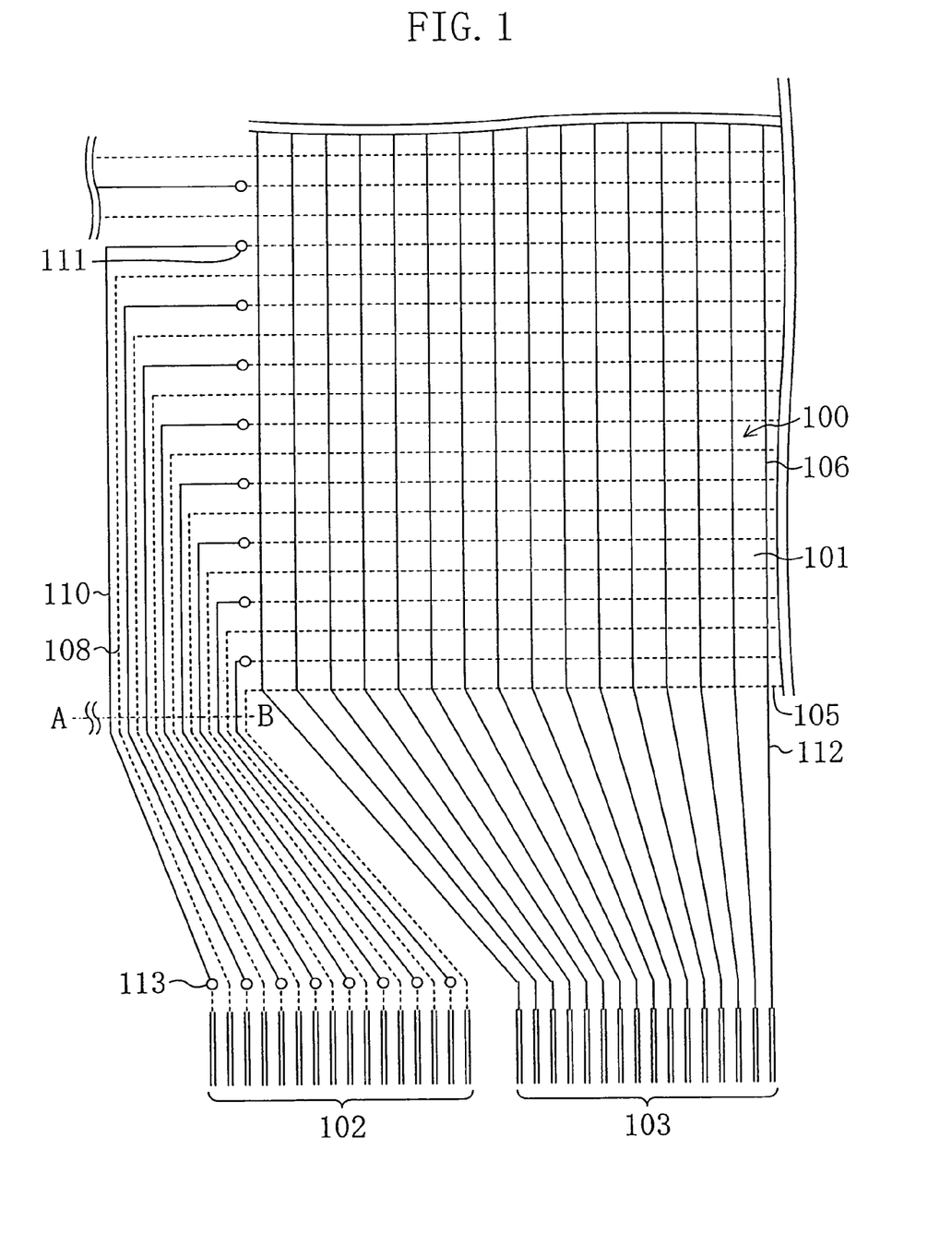
FIG. 1 is a schematic plan view illustrating part of a TFT substrate of Embodiment 1.
Figure 2:
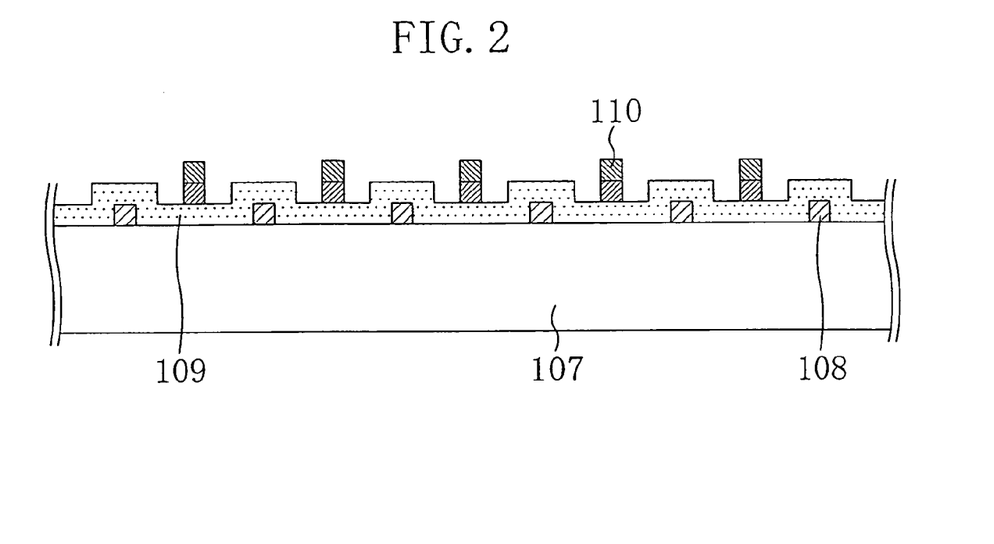
FIG. 2 is a sectional view taken along the line A-B shown in FIG. 1.

FIG. 1 is a schematic plan view illustrating part of a TFT substrate of Embodiment 1. FIG. 2 is a sectional view taken along the line A-B shown in FIG. 1. The TFT substrate of this embodiment includes: a plurality of gate electrode wires 105 formed on a transparent insulating substrate 107; an insulating layer 109 covering the gate electrode wires 105; a plurality of source electrode wires 106 which are formed on the insulating layer 109 and intersect with the gate electrode wires 105, respectively; a plurality of TFTs (not shown) arranged near the intersections of the gate electrode wires 105 and the source electrode wires 106, respectively; a display region 100 including a plurality of pixel electrodes 101 connected to the TFTs, respectively; a plurality of gate electrode terminals 102 arranged at the periphery of the display region 100 (at the bottom side of the display region 100 in FIG. 1) to input signals to the gate electrode wires 105, respectively; a plurality of source electrode terminals 103 arranged at the periphery of the display region 100 (at the bottom side of the display region 100 in FIG. 1) to input signals to the source electrode wires 106, respectively; a plurality of gate routing wires 108 and 110 arranged at the periphery of the display region 100 (at the left and bottom sides of the display region 100 in FIG. 1) to connect the gate electrode wires 105 to the gate electrode terminals 102, respectively; and a plurality of source routing wires 112 arranged at the periphery of the display region 100 (at the bottom side of the display region 100 in FIG. 1) to connect the source electrode wires 106 to the source electrode terminals 103, respectively.

The display region 100 including the pixel electrodes 101 is rectangular and the gate electrode terminals 102 and the source electrode terminals 103 are arranged in proximity to any one of the sides of the display region 100 (the bottom side in this embodiment). If the terminals 102 and 103 are arranged in proximity to any one of the sides of the display region 100 in this way, the left and right sides of the display region 100 are not occupied by the terminals 102 and 103, thereby preventing the center of a display screen from leaning to the left or right side. That is, the screen is positioned at the center of the substrate.

Figure 3:
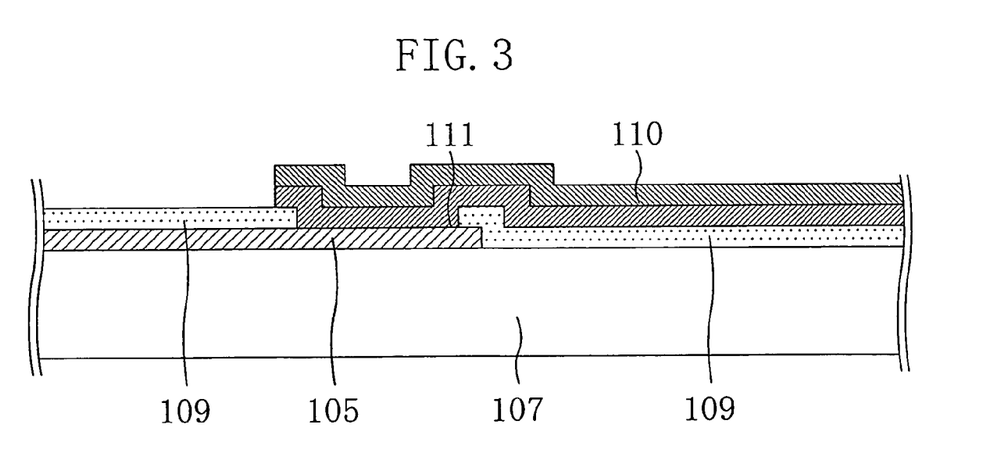
FIG. 3 is a schematic sectional view illustrating a first contact hole 111 and the vicinity.

The gate routing wires 108 and 110 include first routing wires 108 made of gate material for forming the gate electrode wires 105 and second routing wires 110 which are formed on the insulating layer 109 covering the first routing wires 108 and made of source material for forming the source electrode wires 106. As shown in FIG. 2, when viewed in plan, the first and second routing wires 108 and 110 are arranged alternately not to overlap each other. The second routing wires 110 formed on the insulating layer 109 are electrically connected to the gate electrode wires 105 and the gate electrode terminals 102 through first and second contact holes 111 and 113 formed in the insulating layer 109, respectively. FIG. 3 is a schematic sectional view illustrating the first contract hole 111 and the vicinity. As shown in FIG. 3, the gate electrode wire 105 is connected to the wire 110 formed at a different level via the first contact hole 111. Therefore, hereinafter, the contact holes 111 and 113 may be referred to as conductive wire connecting parts.

Figure 4A:
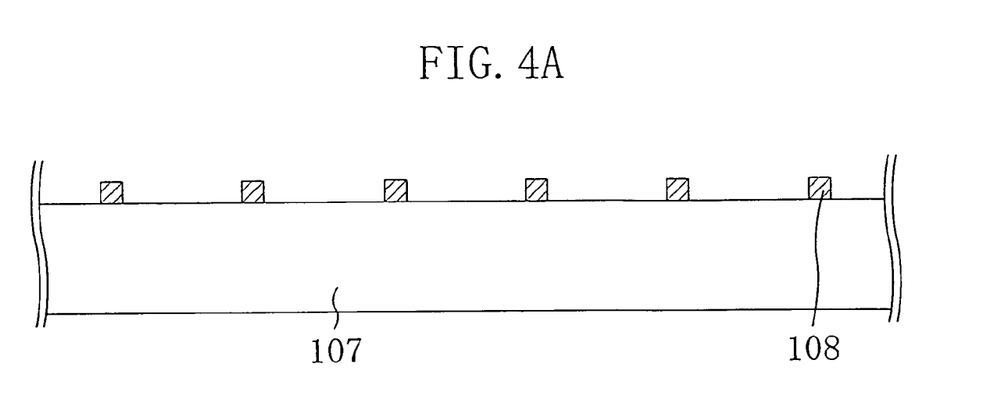
FIGS. 4A, 4B and 4C are schematic sectional views taken along the line A-B shown in FIG. 1 for illustrating the manufacturing steps.
Figure 4B:
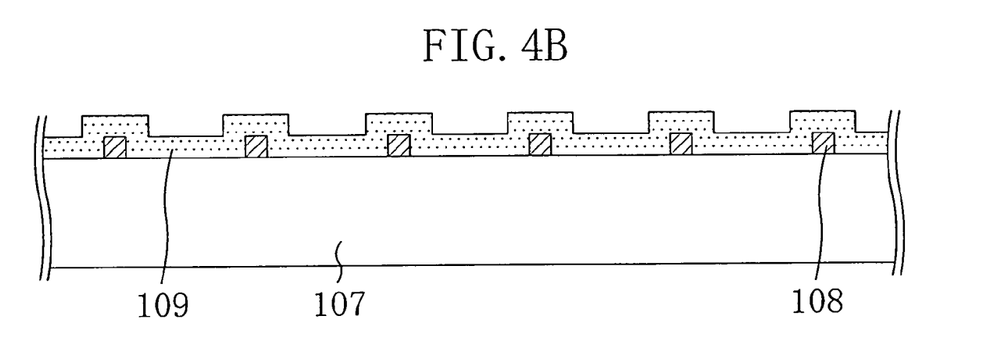
Figure 4C:
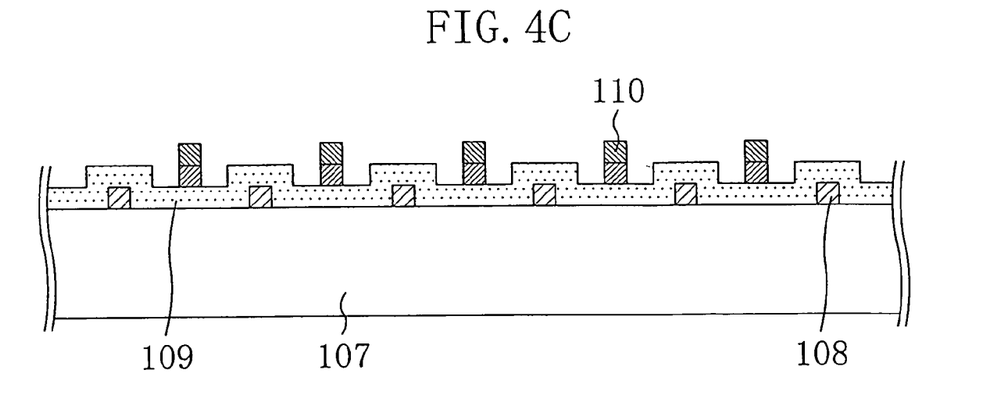
Figure 5A:
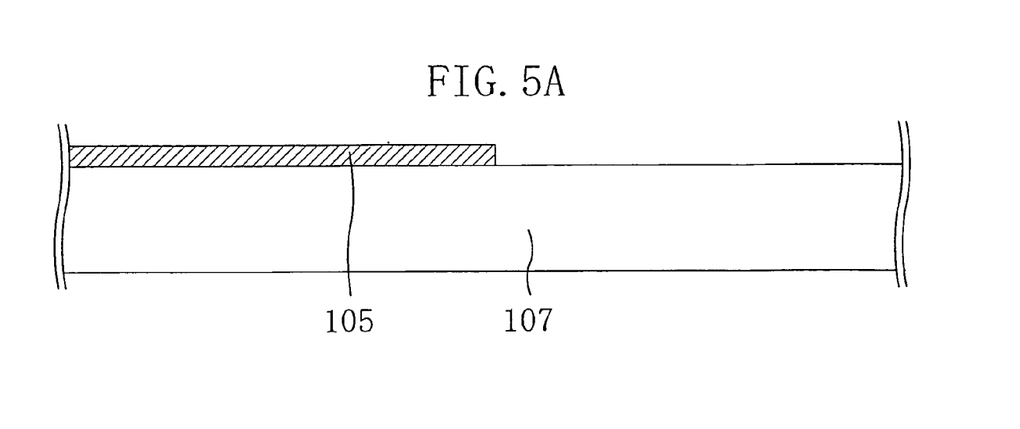
FIGS. 5A, 5B and 5C are schematic sectional views of a conductive wire connecting part shown in FIG. 1 for illustrating the manufacturing steps.
Figure 5B:
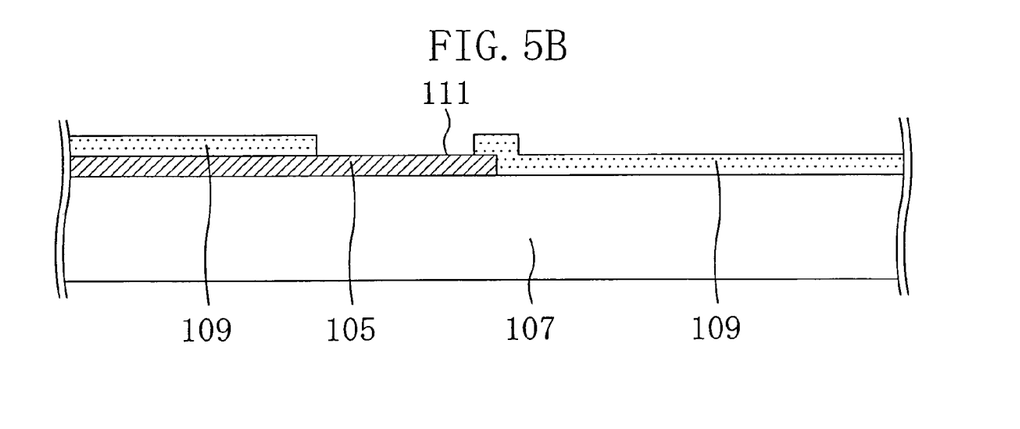
Figure 5C:
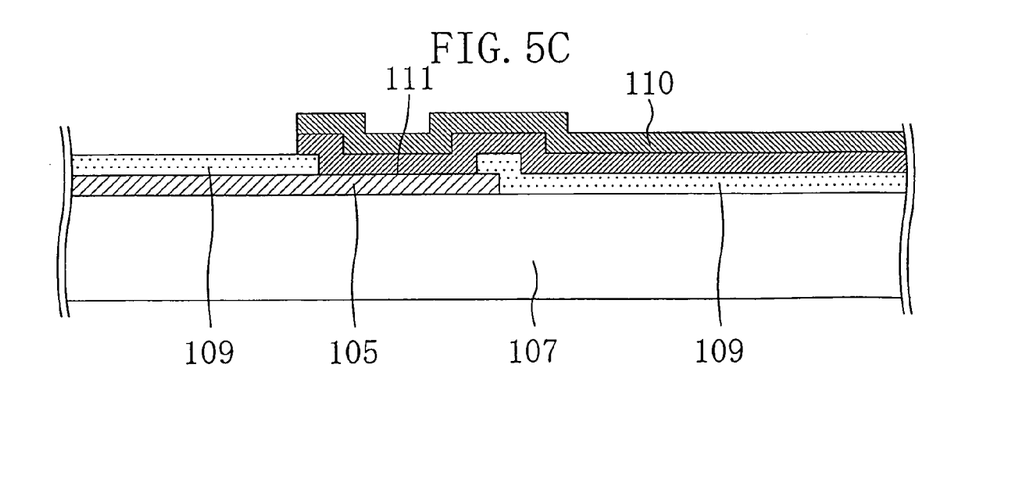

Then, with reference to FIGS. 4 and 5, an explanation is given of the steps of manufacturing the TFT substrate of this embodiment. FIGS. 4A, 4B and 4C are schematic sectional views taken along the line A-B shown in FIG. 1 for illustrating the manufacturing steps, while FIGS. 5A, 5B and 5C are schematic sectional views of the conductive wire connecting part 111 for illustrating the manufacturing steps.

First, a tantalum (Ta) film as gate material is formed on a transparent glass substrate 107 using a sputtering apparatus and subjected to photolithography and etching to form a gate pattern including gate electrode terminals 102, gate electrode wires 105 and gate connection wires (first routing wires) 108 (see FIGS. 4A and 5A). The gate material may be any material as long as desired bus line resistance is obtained and favorable ohmic contact resistance is obtained between the gate material and indium tin oxide (ITO) which is transparent electrode material to be described later. For example, Ta, Al, Cr, Ti or nitrides of them stacked in layers may be used. Not only a monometal layer, an alloy layer or a layered film including two or more metal layers may also be used.

A silicon nitride film (SiNx) as an insulating layer 109 is formed and an a-Si layer and an n+ layer as a semiconductor layer are formed. Then, the semiconductor layer is subjected to photolithography and etching to form island features, which are the core of TFT transistors. The semiconductor layer in other regions than the display region 100 is all etched away. Then, first and second contact holes 111 and 113 are formed in the insulating layer 109 by photolithography and etching (see FIG. 5B).

An indium tin oxide (ITO) film and a tantalum (Ta) film for forming a layered source structure are formed using a sputtering apparatus. Then, the Ta film as a source is subjected to photolithography and etching, and then the ITO film is subjected to photolithography and etching to form a source pattern including source electrode terminals 103, source electrode wires 106 and source connection wires (second routing wires) 110 (see FIGS. 4C and 5C). Then, source/drain electrode patterns and transparent pixel electrodes 101 are formed. The source material may be any material as long as desired bus line resistance is obtained. For example, Ta, Al, Mo, Ti or nitrides of them stacked in layers may be used. Further, not only a source/ITO layered structure, a single source layer may be employed.

Using a source resist or the source pattern, source/drain isolations for the island features in the display region 100 are formed. Further, a passivation film (not shown) is formed and patterned thereon to complete the TFT substrate of this embodiment.

Aiming at higher aperture ratio, a organic resin film may be formed and patterned on the passivation film pattern, and then an upper pixel electrode pattern including pixel electrodes arranged at such intervals that are reduced down to the limit may be formed on the organic resin film pattern. Further, the method for manufacturing the TFTs is not limited to the one described above. For example, a method for manufacturing amorphous silicon TFTs or a method for manufacturing polysilicon TFTs may also be employed.

In this way, the gate connection wires (first routing wires) 108 are formed on the transparent glass substrate 107 by patterning simultaneously when the gate electrode terminals 102 and the gate electrode wires 105 are formed. The insulating layer 109 is formed to cover the gate connection wires 108 and provided with the first contact holes 111 as the conductive pattern connecting parts. The source connection wires (second routing wires) 110 are formed on the insulating layer 109 by patterning simultaneously when the source electrode terminals 103 and the source electrode wires 106 are formed. At this time, the source connection wires 110 are electrically connected to the gate electrode wires 105 via the first contact holes 111 as shown in FIG. 5C. Though not shown, the source connection wires 110 are electrically connected also to the gate electrode terminals 102 via the second contact holes 113.

As shown in FIG. 4C, as the gate routing wires connecting the gate electrode wires 105 to the gate electrode terminals 102, the gate connection wires 108 and the source connection wires 110 are arranged alternately not to overlap each other when viewed in plan. By so doing, the peripheral region around the display region 100 is reduced. Further, if the intervals between the gate connection wires 108 and the source connection wires 110 are reduced, the intervals between the gate wires and the intervals between the source wires are ensured sufficiently, thereby improving manufacturing yield. As a result, a wire-and-interval width (the sum of the width of a single wire and the interval between the wires) is reduced.

As to monitors for recent cellular phones, it has been required to arrange the screen at the center position and reduce the size of the peripheral region around the screen. Here, as an example, a 2.2-inch transmissive QCIF (Quarter Common Intermediate Format) liquid crystal display device is formed using the TFT substrate of this embodiment. The liquid crystal display device may be formed by a common technique. For example, on a color filter formed on a transparent insulating substrate, transparent electrodes and an alignment film are formed to obtain a color filter substrate. Further, a TFT substrate provided with an alignment film is bonded to the color filter substrate and liquid crystal material is introduced and sealed in the space between the bonded substrates. Then, polarizers are adhered thereto and a drive IC and flexible cables for signal input are provided. The method for manufacturing the liquid crystal display device is not limited thereto. As long as the TFT substrate formed in this embodiment is used, the liquid crystal display device may not include the polarizers, alignment films or color filter. In the manufacture of the 2.2-inch transmissive QCIF liquid crystal display device, the width of a wire region (the minimum distance from the display region 100 to the edge of the substrate, i.e., the width of the region on the left side of the display region 100 in FIG. 1) is 1.8 mm. Therefore, the wire-and-interval width of the gate routing wire is 8 µm, i.e., the wires are arranged with a small pitch.

To realize the small pitch arrangement, pattern A made of common gate material only, pattern B including wires of a two-layered gate/source structure disclosed by Japanese Patent No. 3276557 and pattern C including alternately arranged gate/source wires of this embodiment were prepared to obtain liquid crystal panel modules. Table 1 shows the display quality of each liquid crystal panel module.

TABLE 1

| | Evaluation item | | |
|---|---|---|---|
| | A<br>Wires made<br>of gate<br>material<br>only | B<br>Layered gate/<br>source wires | C<br>Alternately<br>arranged<br>gate/source<br>wires |
| Display quality | No problem | Streaks and stripe unevenness occurred | No problem |
| Power consumption (ratio only) | 1 | 1.4 | 1 |
| Probability of electrostatic breakdown | 0.0% | 11.0% | 0.0% |
| Probability of occurrence of short circuit defects | 7.0% | 0.5% | 0.5% |
| Overall evaluations | Yield deteriorated (short circuit) | Display quality defects observed Power consumption increased | No problem |

TABLE 1-continued

| | Evaluation item | | |
|---|---|---|---|
| | A<br>Wires made<br>of gate<br>material<br>only | B<br>Layered gate/<br>source wires | C<br>Alternately<br>arranged<br>gate/source<br>wires |
| | | Yield deteriorated (electrostatic breakdown) | |

As to the pattern A (made of gate material only), the wire-and-interval width was reduced beyond the limit with a decrease in size of the peripheral region. Since the interval was reduced to an extreme, the probability of occurrence of short circuit defects between the gate wires increased 14 times larger as compared with the other patterns. This brought about a drastic decrease in yield.

As to the pattern B (two-layered gate/source wires disclosed by Japanese Patent No. 3276557), the gates and the sources coincide with each other when viewed in plan. Therefore, the interaction between the capacitances of the gates and the sources becomes more significant. This brought about signal transmission delay and generated stripe unevenness along the gate electrode wires 105 in the display region 100, resulting in causing a problem in display quality. Further, impedance increased with an increase in capacitance, thereby increasing power consumption by 40%. Moreover, due to the two-layered gate/source structure, electrostatic breakdown occurred many times in the insulating layer 109.

Unlike the pattern A, in the pattern C (alternately arranged gate/source wires of this embodiment), the intervals were not reduced but ensured to a sufficient degree. Further, unlike the pattern B, the wires were not stacked in two layers and therefore problems that arose in the patterns A and B did not occur. Thus, the obtained transmissive liquid crystal display device was given with excellent display quality and high manufacturing yield without causing any inherent problems.

Points to keep in mind in manufacturing the alternately arranged gate/source wires as the gate routing wires are: variations in sheet resistance between the gate and the source which occur during the manufacture; and variations in line width between the gate connection wires 108 and the source connection wires 110 which occur during the manufacture. Thus, the alternately arranged gate/source wires show variations in wire resistance. As the difference between the gate wire resistance and the source wire resistance becomes large, a difference in charging rate becomes large. This may possibly deteriorate the display quality. Further, due to variations between the gates and the sources derived from photoalignment process, the gate connection wires 108 and the source connection wires 110 may possibly overlap (approach) each other. Therefore, due to the interaction between their capacitances, display quality may possibly be impaired.

In terms of these points, liquid crystal panel modules were formed under the conditions where the variations in sheet resistance and line width were taken into consideration and the gate connection wires 108 and the source connection wires 110 were formed to be close to each other. Display quality of each liquid crystal panel module is shown in Tables 2 to 4. The intervals between the gate and the source described below are each an interval between the gate connection wire 108 and the source connection wire 110 when viewed in plan.

(a) Interval Between Gate and Source: 1 μm

TABLE 2

|  |  | Gate wire resistance | | | | | |
|---|---|---|---|---|---|---|---|
|  |  | 5 kΩ | 10 kΩ | 15 kΩ | 20 kΩ | 25 kΩ | 30 kΩ |
| Source wire resistance | 5 kΩ | No problem | No problem | No problem | No problem | No problem | No problem |
|  | 10 kΩ | No problem | No problem | No problem | No problem | No problem | No problem |
|  | 15 kΩ | No problem | No problem | No problem | No problem | No problem | No problem |
|  | 20 kΩ | No problem | No problem | No problem | No problem | No problem | No problem |
|  | 25 kΩ | No problem | No problem | No problem | No problem | No problem | No problem |
|  | 30 kΩ | No problem | No problem | No problem | No problem | No problem | No problem |

(b) Interval Between Gate and Source: 0 μm (No Interval is Given between the Gate and the Source)

TABLE 3

|  |  | Gate wire resistance | | | | | |
|---|---|---|---|---|---|---|---|
|  |  | 5 kΩ | 10 kΩ | 15 kΩ | 20 kΩ | 25 kΩ | 30 kΩ |
| Source wire resistance | 5 kΩ | No problem | No problem | No problem | No problem | No problem | No problem |
|  | 10 kΩ | No problem | No problem | No problem | No problem | No problem | No problem |
|  | 15 kΩ | No problem | No problem | No problem | No problem | No problem | No problem |
|  | 20 kΩ | No problem | No problem | No problem | No problem | No problem | No problem |
|  | 25 kΩ | No problem | No problem | No problem | No problem | No problem | No problem |
|  | 30 kΩ | No problem | No problem | No problem | No problem | No problem | No problem |

(c) Interval Between Gate and Source: −1 μm (the Gate and the Source Overlapped each other by 1 μm)

TABLE 4

|  |  | Gate wire resistance | | | | | |
|---|---|---|---|---|---|---|---|
|  |  | 5 kΩ | 10 kΩ | 15 kΩ | 20 kΩ | 25 kΩ | 30 kΩ |
| Source wire resistance | 5 kΩ | No problem | No problem | Stripe unevenness observed | Stripe unevenness observed | Stripe unevenness observed | Stripe unevenness observed |
|  | 10 kΩ | No problem | No problem | No problem | Stripe unevenness observed | Stripe unevenness observed | Stripe unevenness observed |
|  | 15 kΩ | Stripe unevenness observed | No problem | No problem | No problem | Stripe unevenness observed | Stripe unevenness observed |
|  | 20 kΩ | Stripe unevenness observed | Stripe unevenness observed | No problem | No problem | No problem | Stripe unevenness observed |
|  | 25 kΩ | Stripe unevenness observed | Stripe unevenness observed | Stripe unevenness observed | No problem | No problem | No problem |
|  | 30 kΩ | Stripe unevenness observed | Stripe unevenness observed | Stripe unevenness observed | Stripe unevenness observed | No problem | No problem |

As shown in Tables 2 and 3, as long as the interval of 0 μm or more is ensured between the gate wire and the source wire, the display quality is not impaired even if the sheet resistance and the line width are varied. From the viewpoint of manufacture, it is enough possible to control the variations in resistance of the gate wires and the source wires within 5 kΩ to 30 kΩ as shown in Tables 2 and 3.

The display quality is not impaired under the condition where the difference between the gate wire resistance and the source wire resistance is small. However, when the gate wire and the source wire overlapped by 1 μm, variations in wire resistance occurred during the manufacture as shown in Table 4. When the gate wire resistance and the source wire resistance were greatly varied, stripe unevenness was observed along the gate electrode wires 105 in the display region 100, causing a problem in display quality. Thus, if the gate wire and the source wire overlap each other even if only slightly, the display quality is impaired and manufacturing yield decreases.

The stripe unevenness is the same phenomenon as the unevenness which is observed in stripes along the gate electrode wires 105 in the display region 100 in the case of the pattern B (two-layered gate/source wires disclosed by Japanese Patent No. 3276557). If the gate wires and the source wires overlap each other, electrostatic breakdown occurs in the insulating layer 109.

Therefore, while the variations caused during the manufacture are considered, it is necessary to arrange the gate wires and the source wires not to overlap each other. If the pattern C (alternately arranged gate/source wires) is employed to achieve the small pitch arrangement of this embodiment where the wire-and-interval width is 8 μm, the gate wires and the source wires are arranged with a sufficient margin not to overlap each other.

Embodiment 2

Embodiment 1 is directed to a transmissive liquid crystal display. However, in this embodiment, as a monitor for recent mobile applications, an explanation is given of a transmittive liquid crystal display device which is becoming as one of the most demanded display devices on the market, i.e., a display device capable of operating in both reflective and transmissive modes.

The transmittive liquid crystal device is manufactured substantially in the same manner as the transmissive liquid crystal display of Embodiment 1. However, this embodiment is different from Embodiment 1 in steps performed after the formation of the passivation film pattern until the completion of the TFTs. First, after the passivation film pattern is formed, in a photolithography step, an organic resin film is formed on the transparent pixel electrode using a spin coater so that the thickness becomes uniform. Then, smooth unevenness is given to the surface of the organic resin film in a reflective region, while the organic resin film in a transmissive region is removed to expose the transparent pixel electrode.

Using a sputtering apparatus, a molybdenum (Mo) film and an aluminum (Al) film are formed in sequence and subjected to photolithography and etching to form a reflective electrode pattern on the uneven organic resin film pattern. In this embodiment, aluminum is used as the reflective electrode, but this is not limitative. For example, Al-based alloy material or conductive material having high light reflectance may also be used. Further, the Mo film formed as a base layer below the Al film functions as a barrier metal for preventing electrolytic corrosion between Al and ITO to be formed as a drain. Other material than Mo may be used as long as it prevents the electrolytic corrosion. Further, if material which does not cause the electrolytic corrosion is used as the reflective electrode or transparent electrode, the base layer is not necessary.

Like the transmissive liquid crystal display device of Embodiment 1, a 2.2-inch QCIF (Quarter Common Intermediate Format) transmittive liquid crystal display device is formed. In the same manner as in Embodiment 1, the gate routing wires are arranged with a small pitch of 8 μm.

To realize the small pitch arrangement in the same manner as in Embodiment 1, pattern A made of gate material only, pattern B including wires of a two-layered gate/source structure disclosed by Japanese Patent No. 3276557 and pattern C including alternately arranged gate/source wires of this embodiment were prepared to obtain liquid crystal panel modules. Table 5 shows the display quality of each liquid crystal panel module.

TABLE 5

| | Evaluation item | | |
|---|---|---|---|
| | A Wires made of gate material only | B Layered gate/source wires | C Alternately arranged gate/source wires |
| Display quality | No problem | Streaks and stripe unevenness occurred | No problem |
| Power consumption (ratio only) | 1 | 1.4 | 1 |
| Probability of electrostatic breakdown | 0.0% | 10.0% | 0.0% |
| Probability of occurrence of short circuit defects | 7.0% | 0.5% | 0.5% |
| Probability of radial unevenness | 0.0% | 5.0% | 0.0% |
| Display quality | Yield deteriorated (short circuit) | Display quality defects observed Power consumption increased Yield deteriorated (electrostatic breakdown) Yield deteriorated (radial unevenness) | No problem |

As to the pattern A (made of gate material only), the interval was extremely reduced in the same manner as in Embodiment 1. Therefore, the probability of occurrence of short circuit defects between the gate wires increased 14 times larger as compared with the other patterns. This brought about a drastic decrease in yield.

As to the pattern B (two-layered gate/source wires disclosed by Japanese Patent No. 3276557), the gates and the sources coincide with each other when viewed in plan. Therefore, like in Embodiment 1, streaks and stripe unevenness occurred, power consumption increased by 40% and electrostatic breakdown occurred many times. Further, due to the two-layered structure, height difference between the source wires and the insulating layer increased, thereby causing radial unevenness in the organic resin film to deteriorate the manufacturing yield to a further degree.

Unlike the pattern A, in the pattern C (alternately arranged gate/source wires of this embodiment), the intervals were not reduced but ensured to a sufficient degree. Further, unlike the pattern B, the wires were not stacked in two layers and therefore problems that arose in the patterns A and B did not occur. Thus, the obtained transmittive liquid crystal display device was given with excellent display quality and high manufacturing yield without causing any inherent problems.

In Embodiments 1 and 2, the gate routing wires 108 and 110 are the alternately arranged gate/source wires. However, instead of or together with the gate routing wires, the source routing wires 112 may be the alternately arranged gate/source wires. Further, not only the transmissive or transmittive electrodes described in Embodiments 1 and 2, the pixel electrodes 101 may be reflective electrodes.

As to the alternately arranged wires according to the present invention, gate connection wires and source connection wires are alternately arranged. Further, considering variations caused during the manufacture, the source connection wires are not formed immediately above the gate connection wires with an insulating layer interposed therebetween. If the alternately arranged wires according to the present invention are employed, a region for forming the wires at the periphery of the display screen is reduced in size while the following effects are obtained. First, the interaction between the capacitances of the gate wires and the source wires does not occur, thereby giving excellent display quality. Further, with the alternately arranged wires according to the foregoing embodiments, it has been confirmed that power consumption is reduced by 40% as compared with layered wires.

Second, electrostatic breakdown does not occur in the insulating layer. This allows an improvement in manufacturing yield. Third, height difference generated among the gate connection wires, insulating layer and source connection wires is drastically reduced as compared with the layered wires. As a result, in reflective mode display devices and reflective/transmissive transmittive mode display devices, radial unevenness starting from the routing wires does not occur, thereby allowing an improvement in manufacturing yield. Fourth, if the alternately arranged gate/source wires are employed, intervals between the gate wires and intervals between the source wires are sufficiently ensured. This allows a drastic decrease in probability of occurrence of short circuit defects, resulting in an improvement in manufacturing yield.

The alternately arranged gate/source wires of the present invention may be applied not only to recent cellular phones which require the center-positioned display screen and reduction in size of the peripheral region around the screen as described in the foregoing embodiments, but also to the existing mobile devices and other monitors in which the reduction in size of the peripheral region is not required, i.e., the peripheral region may be relatively large. By doing so, the probability of occurrence of short circuit defects decreases more drastically and the manufacturing yield improves to a further extent.

Embodiment 3

Figure 6:
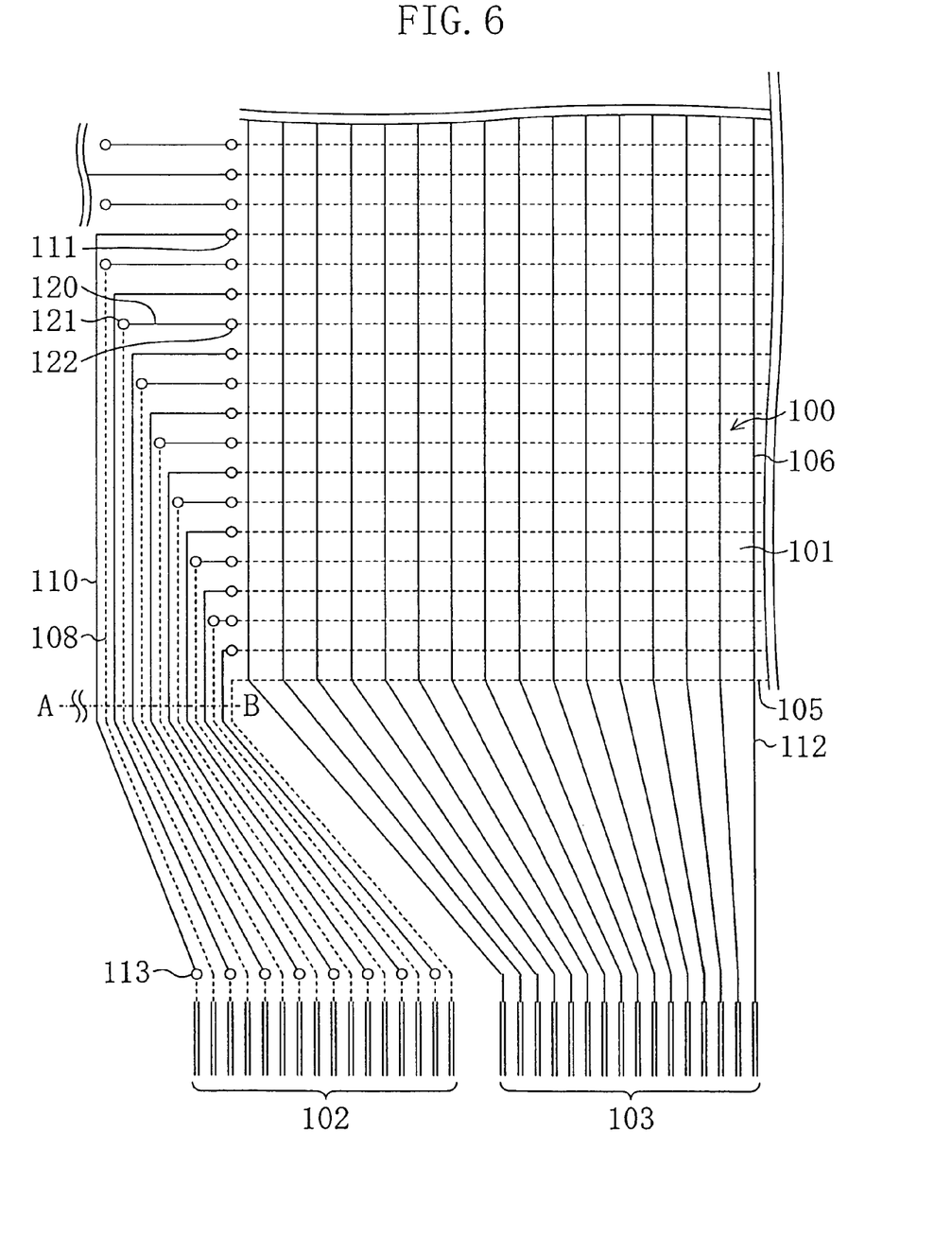
FIG. 6 is a schematic plan view illustrating part of a TFT substrate of Embodiment 3.

FIG. 6 is a schematic plan view illustrating part of a TFT substrate according to Embodiment 3. Referring to FIG. 6, components that function substantially in the same manner as those of the TFT substrate of Embodiment 1 are given with the same reference numerals and description thereof is omitted.

In the TFT substrate shown in FIG. 1, second routing wires (source connection wires) 110 are electrically connected to gate electrode wires 105 via first contact holes 111 and to gate electrode terminals 102 via second contact holes 113. Therefore, between the gate electrode wire 105 and the gate electrode terminal 102, contact resistance is generated at two conductive wire connecting parts 111 and 113. On the other hand, first routing wires (gate connection wires) 108 are not in contact with the source wires. Therefore, contact resistance is not generated between the gate electrode wire 105 and the gate electrode terminal 102. This causes a difference in resistance between the first routing wires 108 and the second routing wires 110. Therefore, display quality defects such as stripe unevenness may possibly occur.

In this embodiment, the first routing wires 108 include wires 120 which are formed on the insulating layer 109 and made of source material. The wires 120 are formed on the insulating layer 109 covering the first routing wires 108, gate electrode wires 105 and gate electrode terminals 102 and electrically connected to the first routing wires 108 and the gate electrode wires 105 via contact holes 121 and 122 formed in the insulating layer 109. That is, in the gate electrode wire 105 and the gate electrode terminal 102 connected via the first routing wire 108, contact resistance is generated at two conductive wire connecting parts 121 and 122.

Thus, each of the gate electrode wires 105 is connected to each of the gate electrode terminals 102 via the contact holes of the same number (two) formed in the insulating layer 109. Therefore, difference in resistance between the first routing wires 108 and the second routing wires 110 is reduced. This inhibits the occurrence of display quality defects such as stripe unevenness.

The wires 120 are connected to the gate electrode wires 105, but they may be connected to the gate electrode terminals 102. In this case, it is desired that the wires 120 are arranged with a sufficient pitch to prevent short circuit defects between adjacent second routing wires 110.

According to the present invention, in a display device, a center-positioned screen is provided and the peripheral region around the screen is reduced, thereby allowing an improvement in manufacturing yield.

The embodiments of the present invention have been described above, but the technical scope of the present invention is not limited to the scope of the description of the foregoing embodiments. It should be understood by those skilled in the art that the embodiments are merely for explanation and can be modified by changing the components as needed and that the modified embodiments are also within the technical scope of the present invention.

Japanese Patent No. 2003-327181 filed in Japan on Sep. 19, 2003 and the entire disclosure of which are fully incorporated in the specification of the present application by reference.

An electrode-wiring substrate of the present invention is applicable to liquid crystal displays, field emission displays, organic or inorganic EL displays, electrochromic displays, plasma displays and the like.

The invention claimed is:

1. An electrode-wiring substrate comprising:
   an insulating substrate;
   a plurality of adjacent gate electrode wires which is formed on the insulating substrate;
   a plurality of adjacent source electrode wires which intersects with the plurality of adjacent gate electrode wires;
   an insulating layer which electrically insulates the plurality of adjacent gate electrode wires from the plurality of adjacent source electrode wires;
   a plurality of switching elements, where each of the plurality of switching elements is arranged near a corresponding intersection of one of the plurality of adjacent gate electrode wires and one of the plurality of adjacent source electrode wires;
   a display region which includes a plurality of pixel electrodes, where each of the plurality of pixel electrodes is connected to a corresponding one of the plurality of switching elements;
   a plurality of gate electrode terminals which is arranged at the periphery of the display region such that each of the plurality of gate electrode terminals is arranged to input signals to a corresponding one of the plurality of adjacent gate electrode wires;

a plurality of source electrode terminals which is arranged at the periphery of the display region such that each of the plurality of source electrode terminals is arranged to input signals to a corresponding one of the plurality of adjacent source electrode wires;

a plurality of gate routing wires is arranged at the periphery of the display region such that each of the plurality of gate routing wires is arranged to connect a corresponding one of the plurality of adjacent gate electrode wires to a corresponding one of the plurality of gate electrode terminals; and a plurality of source routing wires is arranged at the periphery of the display region such that each of the plurality of source routing wires is arranged to connect a corresponding one of the plurality of adjacent source electrode wires to a corresponding one of the plurality of source electrode terminals; wherein the plurality of gate routing wires and/or the plurality of source routing wires include:

a first plurality of routing wires which are made of gate material for forming the gate electrode wires; and a second plurality of routing wires which are electrically insulated from the first routing wires by the insulating layer and which are made of source material for forming the source electrode wires;

the first plurality of routing wires and the second plurality of routing wires are alternately arranged so as not to coincide with each other when viewed in plan;

the insulating layer includes at least a plurality of corresponding pairs of a first connection hole and a second connection hole; and the plurality of adjacent gate electrode wires, the plurality of gate electrode terminals, the plurality of adjacent source electrode wires, the plurality of source electrode terminals, and the corresponding pairs of a first connection hole and a second connection hole are arranged such that:

each of the plurality of adjacent gate electrode wires is connected to a corresponding one of the plurality of gate electrode terminals via at least one of the corresponding pairs of a first connection hole and a second connection hole; and/or each of the plurality of adjacent source electrode wires is connected to a corresponding one of the plurality of source electrode terminals via at least one of the corresponding pairs of a first connection hole and a second connection hole.

2. An electrode-wiring substrate according to claim 1, wherein the display region is rectangular; and each of the plurality of gate electrode terminals and each of the plurality of source electrode terminals are arranged in proximity to any one of the sides of the display region.

3. An electrode-wiring substrate according to claim 1, wherein the plurality of switching elements are thin film transistors.

4. An electrode-wiring substrate according to claim 1, wherein the plurality of gate routing wires includes the first plurality of routing wires and the plurality of second routing wires;

either the first plurality of routing wires or the second plurality of routing wires further includes a plurality of wires which are arranged on the insulating layer and which are made of the source material or the gate material; and each of the plurality of adjacent gate electrode wires is connected to a corresponding one of the plurality of gate electrode terminals via at least one of the corresponding pairs of a first connection hole and a second connection hole.

5. An electrode-wiring substrate according to claim 1, wherein the plurality of source routing wires includes the first plurality of routing wires and the second plurality of routing wires;

either the first plurality of routing wires or the second plurality of routing wires further includes a plurality of wires which are arranged on the insulating layer and which are made of the source material or the gate material; and the source electrode wires are each connected to the source electrode terminals via connection holes of the same number formed in the insulating layer.

6. An electrode-wiring substrate according to claim 1, wherein each of the plurality of pixel electrodes is made of a transparent conductive film for transmissive display, a reflective conductive film for reflective display, or a set of a transparent conductive film and a reflective conductive film which allows display in both transmissive and reflective modes.

7. A display device including an electrode-wiring substrate according to claim 1 and counter electrodes facing the electrode-wiring substrate.

8. A liquid crystal display device including an electrode-wiring substrate according to claim 1, a counter substrate facing the electrode-wiring substrate and a liquid crystal layer sandwiched between the electrode-wiring substrate and a counter electrode.

* * * * *